Patented July 20, 1926.

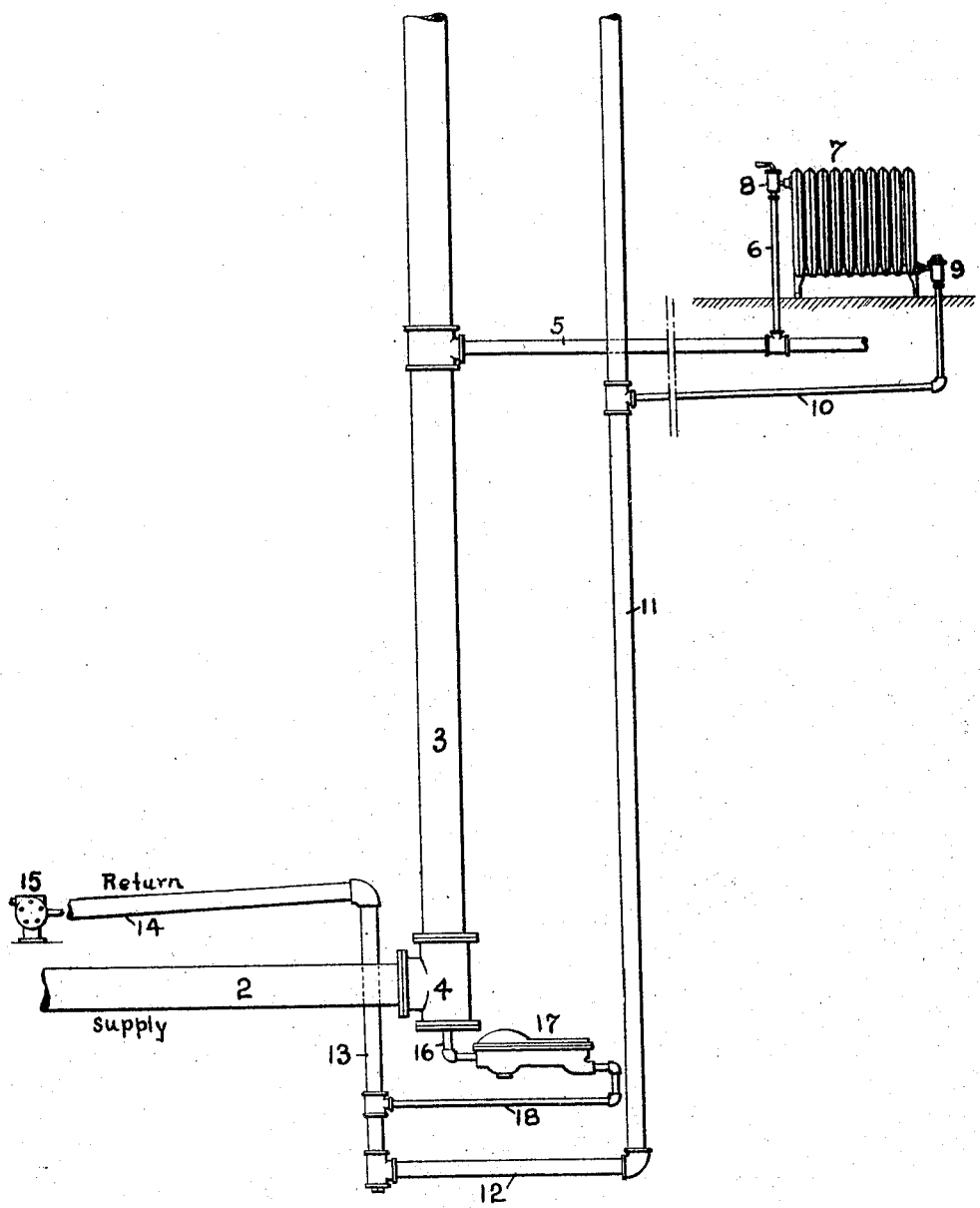

1,593,131

UNITED STATES PATENT OFFICE.

FRANK H. MONTREUIL, OF CHICAGO, ILLINOIS, ASSIGNOR TO WARREN WEBSTER & COMPANY, A CORPORATION OF NEW JERSEY.

VACUUM STEAM-HEATING SYSTEM.

Application filed February 5, 1925. Serial No. 6,932.

The object of my invention is to provide a construction in a vacuum system of steam heating which will insure the removal of the water of condensation from the steam supply main and cause it to be discharged through the return pipe under the influence of the partial vacuum in a substantially silent manner.

In the usual construction of vacuum heating systems, it is sometimes necessary, on account of the grade of the land upon which the building is erected, to keep the distant end of the vacuum return main slightly higher than the end of the steam main of the system and, at the same time, to cause the water of condensation from the steam main to be removed through the vacuum return main, said water of condensation being transferred from the steam main through a suitable trap and lifted to the desired height, whereby it may be delivered into the return main and flow, by gravity, to the place of discharge. When thermostatic traps are used on each of the radiators as units of radiation, said traps are wide open when said radiators or units of radiation are cold, but upon starting up the heating system by the admission of steam to the radiators or units of radiation, it is customary to first put the vacuum pump or its equivalent into operation to create in the return pipes of the system a partial vacuum and thereby withdraw the air from the radiators or units of radiation and the return pipes of the system. The vacuum thus provided is quickly communicated from the return pipes through the radiators or units of radiation to the supply pipe or pipes and the degree of the vacuum is at first substantially the same in both the supply and return sides of the system. Under these conditions, there is practically no differential pressure between the supply pipe and the vacuum return pipe. When the steam is turned into the supply mains, the condensation taking place in said mains and their branch pipes leading to the radiators flows, by gravity, to the lower parts of said pipes and collects at places therein where it may be automatically removed. The condensation will accumulate in the supply pipes at these points of collection and is removed as drip and transferred to the vacuum return main, through a steam trap which permits the passage of the water but prevents the passage of steam, and the discharge from said trap is elevated through a lift pipe and delivered into the vacuum return main under the influence of the partial vacuum therein. In an apparatus of this character, the water of condensation, which collects in the lift pipe between the trap and the vacuum return main, is caused to surge back and forth in its effort to rise from the trap and discharge into the vacuum main, this discharge being very materially interfered with owing to the fact that the trap is so arranged as to seal the lower end of the discharge pipe from draining itself except under the influence of the partial vacuum, and consequently the water in said pipe is in constant commotion and, especially when in excessive amounts, causes objectionable water hammering.

The object of my present improvement is to provide a construction whereby the water of condensation from the steam supply main may pass through the trap and into the vacuum return main at a lower level than the trap whereby the discharge pipe from the trap is capable of draining itself into the vacuum main and the water thus delivered into the vacuum main is commingled with water of condensation received from the return pipes of the system as collections at the lower part of the return pipes where they connect with the vacuum return main and from which point they are lifted by the combined action of the vacuum and the air from the radiators which cooperates in the lift to reduce the weight of the static head of the water of condensation, and thereby aid in its removal under the influence of the partial vacuum, the construction being such that the pipe leading from the trap to the return main is substantially clear of surging water of condensation and hence incapable of producing water hammering.

My invention also consists of improvements hereinafter described whereby the above objects and results are attained, said improvements comprising a certain organization and combination of parts which is fully described hereinafter and more particularly defined in the claims.

In the drawing is shown a portion of a vacuum steam heating apparatus embodying my improvements.

2 is the steam supply main which may receive steam from a boiler or exhaust pipe of a steam engine, as the case may be, and said main terminates in a T connection 4 from the upper part of which the steam riser 3 extends, said riser provided with horizontal branch pipes, such as indicated at 5, from which smaller risers 6 extend for connection with the control valve 8 for regulating the admission of steam to the radiator 7.

14 represents the vacuum return main in which a partial vacuum is maintained by a suitable vacuum pump or other means 15. The vacuum main 14 is slightly inclined from its end adjacent to the steam riser 3 downwardly toward the vacuum creating means, so that the water of condensation may flow by gravity. The end of the return main 14 adjacent to the steam riser 3 connects with the return riser 11 through a loop composed of vertical pipe 13 and horizontal pipe 12, the latter connecting with the bottom of the return riser 11. The return riser 11 connects with the radiators by branch pipes 10 which communicate with the discharge orifices of the radiators through thermostatic or other automatic valves 9 which are so constructed that they permit the passage of water and air but prevent the escape of steam from the radiators. The air which is liberated in the radiators by the condensation of the steam, passes with the water of condensation into the return riser 11 and the water of condensation therefrom collects in the pipe 12 and flows to the bottom of the vertical pipe 13 which acts as a lift under the influence of the vacuum in the return main 14.

The water of condensation from the steam supply main 2 and riser 3 collects in the bottom of the T fitting 4 and passes therefrom through a drip pipe 16 delivering into a steam trap 17 of any suitable construction which permits the passage of water but restricts the escape of steam. Traps of this nature are sometimes provided with automatic valves which also permit the passage of air while preventing the passage of steam, such, for example, as is commercially known on the market as the "Webster heavy duty trap", but I do not restrict myself to any particular construction of trap. The water of condensation passing from this trap 17 flows, by gravity, through a pipe 18 and discharges into the lift pipe 13, and in this manner is delivered from the trap into the returns.

The lifting of the water of condensation in the vertical pipe 13 is facilitated by the intermingling of the air which is received from the heating system and enters with the water into the lower part of said lift pipe 13, and thereby, as before stated, lightens the water column rising in said lift pipe. Furthermore, as said lift pipe 13 is open at the top into the return main 14 and open in the bottom into the return pipe 12, it is manifest that there is no closure of said pipe structure which would cause a water hammering. It is manifest that there is no opportunity for collections of water to remain in pipe 18 and consequently no water hammering therein can occur.

While I have illustrated the steam and return risers in connection with a single radiator, it will be understood that there may be any number of radiators and any of the usual piping arrangements to suit the requirements of the buildings, and I, therefore, do not limit myself in any respect as to the general lay out of the vacuum steam heating apparatus, my invention being confined to the particular means for transferring the water of condensation from the steam supply main to the vacuum return main in substantially the manner shown and with the avoidance of water hammering.

While, in the apparatus as illustrated in the drawing, I have preferred to arrange for the discharge of the water from the pipe 18 directly into the lift pipe 13 so as to have the advantage of the suction produced by the upward rising of the water and air in said lift pipe, nevertheless, it will suffice for the purposes of my invention, broadly considered, that the water from the trap 17 shall be discharged by gravity into the return piping which extends as a downward loop below the supply pipe and trap.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:

1. In a vacuum steam heating apparatus, the combination of a steam supply main, a vacuum return main, steam and return risers, a radiator or heating unit receiving steam from the steam riser and delivering water of condensation and air into the return riser, a vertical lift pipe extending from the bottom of the return riser and connecting at its top with the return main, means for maintaining a partial vacuum in the return main and for causing the water of condensation to rise in the lift pipe, a drip from the steam supply main and riser, a steam trap into which the drip discharges for permitting the discharge of water while preventing the escape of steam, and a discharge pipe from the trap for discharging the water therefrom into the lift pipe by gravity, whereby the water of condensation from the steam main and riser is delivered into the return main with the avoidance of water hammering.

2. In a vacuum steam heating apparatus, the combination of a steam supply main, a vacuum return main, steam and return risers, a radiator or heating unit receiving steam from the steam riser and delivering water of condensation and air into the return riser, a downwardly extending looped piping between the return riser and the return main and extending below the level of the steam supply main, a drip for water of condensation from the steam supply main and riser, a steam trap for permitting the passage of water from the drip pipe while preventing the passage of steam, and a pipe connection from the discharge of the steam trap for permitting the water therefrom to flow by gravity into the looped piping at a level below the trap and steam supply main, whereby the water of condensation from the steam main and riser is delivered into the return main with the avoidance of water hammering.

In testimony of which invention, I hereunto set my hand.

FRANK H. MONTREUIL.